US006982871B2

(12) United States Patent
Tran et al.

(10) Patent No.: US 6,982,871 B2
(45) Date of Patent: Jan. 3, 2006

(54) COMPUTER SWITCH BOX

(76) Inventors: Richard Tran, 2732 W. Northwood, Santa Ana, CA (US) 92704; Nancy Tran, 2732 W. Northwood, Santa Ana, CA (US) 92704

( * ) Notice: Subject to any disclaimer, the term of this patent is extended or adjusted under 35 U.S.C. 154(b) by 0 days.

(21) Appl. No.: 10/873,955

(22) Filed: Jun. 22, 2004

(65) Prior Publication Data

US 2005/0213300 A1  Sep. 29, 2005

Related U.S. Application Data

(63) Continuation-in-part of application No. 10/808,766, filed on Mar. 24, 2004.

(51) Int. Cl.
*H05K 5/00* (2006.01)

(52) U.S. Cl. ........................ 361/686; 713/201; 709/225

(58) Field of Classification Search ................ 361/679, 361/683, 686, 724–727, 685; 709/225; 713/201
See application file for complete search history.

(56) References Cited

U.S. PATENT DOCUMENTS

| 5,894,551 A | * | 4/1999 | Huggins et al. ............ 713/201 |
| 6,741,459 B2 | * | 5/2004 | Imamura ..................... 361/683 |
| 6,785,131 B2 | * | 8/2004 | Ewell et al. ................ 361/686 |

* cited by examiner

*Primary Examiner*—Anatoly Vortman
*Assistant Examiner*—Zachary Pape
(74) *Attorney, Agent, or Firm*—Drummond & Duckworth

(57) ABSTRACT

A computer system including a switch box and bracket assembly including one or more manual switches are provided for controlling the selective activation and deactivation of the computer systems' memory storage devices and network system. Preferably, the computer system includes a wire harnesses including a network cable for connecting a network to the bracket assembly's input port, a relay cable for connecting the bracket assembly's output port to the computer's network port and a manual switch. Instead of network communications being transmitted directly from the network to the network port, the signals are rerouted through the bracket assembly's input port, manual switch and output port, and then routed to the computer's network port. Access to the network is then controlled by simple manual manipulation of a button, toggle or knob to create an open or closed circuit.

9 Claims, 10 Drawing Sheets

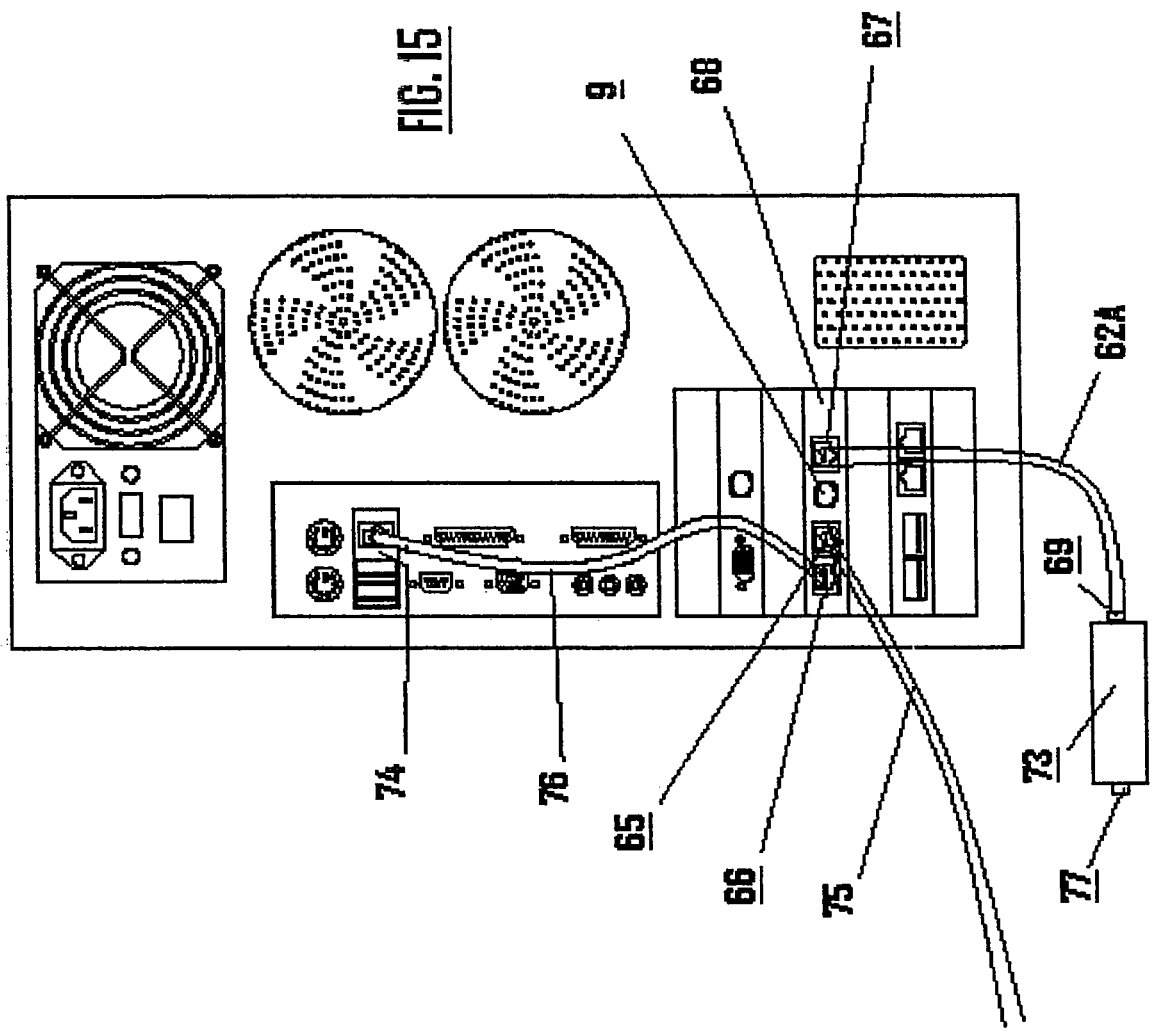

COMPUTER SWITCH BOX

RELATED APPLICATIONS

This application is a continuation-in-part of pending U.S. application Ser. No. 10/808,766, filed Mar. 24, 2004.

BACKGROUND OF THE INVENTION

The present invention relates to computer processing systems. More particularly, the present invention relates to protection devices for enabling and disabling network systems and memory storage devices within a computer system so as to protect against unintentional loading or downloading of information to and from a computer. As used herein, the term "computer memory device" is intended to have its broadest meaning to include any known or anticipated structure for storing information within a computer system. Present memory storage devices include hard drives, floppy drives, CD ROMs, Zip™ drives, etc.

The development of personal computers and mainframe computers experienced considerable growth during the 1970s. These computers were mostly invulnerable to improper access since they were installed in high security environments or provided limited access to unauthorized personnel. However, during the 1980s and 1990s, the networking of computers, and particularly personal computers, greatly contributed to computer system vulnerability. This vulnerability has resulted in malicious codes, typically referred to as computer viruses, being transmitted into and out of computer systems without authorization. The virus propagates itself and spreads wherever it can gain access through an interconnected computer system. Where a computer containing a virus is connected to the Internet, the virus can be transmitted virtually anywhere. Many of these viruses travel to all active computer drives and from there corrupt or destroy data while transmitting themselves to those listed on the computer users' email address lists. This has resulted in billions of dollars in losses worldwide.

A computer system memory storage device is the component most vulnerable to be attacked by a virus. Memory storage devices are areas where all "data" reside which include all user application data (for example data base information, financial information, institutional records, etc.) all application software programs, and even the operating system software itself. A single incident of contamination by a virus may totally erase or render the storage device useless to the point that even the most knowledgeable programmer is unable to recover data.

An additional problem encountered by interconnecting computer systems using networks, such as the Internet, wide area networks (WAN) and local area networks (LAN), is that memory storage devices become vulnerable to unauthorized or undesirable theft of information. For example, computer hackers have "hacked" their way into various computer systems and stolen significant amounts of information. Again, this has resulted in millions, if not billions, of dollars worth of losses.

The advent of file-sharing Internet sites including Napster™ and Kazaa™ have resulted in persons intentionally and unintentionally sharing, in other words downloading, their files to unknown persons all over the Internet. Again, it would be desirable to control the dissemination of such information.

Many persons include more than one operating system on their computer and many programs may be incompatible. Moreover, there has been an increasing demand for storage space on computers. This incompatibility between operating systems and programs and increased demand for storage has resulted in persons mounting more than one storage device within a single central processing unit. As it has become more cost effective to mount additional storage devices, virtually all computer systems have multiple memory storage devices including combinations of hard drive, floppy drives, CD ROMs, etc.

The addition of more storage devices, however, does not protect memory from corruption if the computer comes under attack by a virus. The only known way of protecting a user's software programs, data and documents is by storing a copy on a secondary storage device, such as a second hard drive, and then taking the secondary memory storage device out of the data stream.

When such a companion or secondary memory storage device is used on a single computer, it is desirable to be able to selectively isolate the memory storage device or devices from outside influence without inhibiting the computer-user's ability to access information from the secondary drive as quickly and as efficiently as needed. Thus, there is a significant need for a system that not only isolates a memory storage device from Internet corruption, but also isolates a memory storage device from conventional networks for providing confidentiality and protection against viruses, hacking and file-sharing.

In light of the relatively recent origin of the problems, there have been few innovators in the computer field that have proposed protection which is both effective and affordable for the average user. Virus protection is typically provided by software programs such as those available from McAfee™, Norton™ and others which focus on detecting viruses being spread on an ongoing basis. Unfortunately, these virus protection programs are not infallible and they do not provide protection against others downloading one's files without authorization.

An additional attempt to protect memory storage devices from unwanted access is to provide the storage device with some kind of ability for turning off the "read" or "write" function. For example, many tape and disc storage devices offer a switch for turning off the "write" function. Large mainframe computers have capabilities for turning on and off individual memory storage devices such as magnetic tape or the like.

Unfortunately, very limited attempts have been made to protect the memory storage devices and network access to individual personal computers. One such attempt is disclosed in U.S. Publication No. 2003/1077403. This reference describes a switching system which will activate and deactivate the power supply to individual storage devices such as hard drives and CD-ROMs. This construction provides significant protection to a memory storage device as access is completely eliminated when the power supply to the memory storage device is disconnected. Unfortunately, however, each time the power is deactivated and reactivated to the memory storage device, the unit must reboot taking an undesirable amount of time. It would therefore be desirable to provide protection to a memory storage device without necessarily deactivating the power to it.

Still additional attempts have been made to protect computer systems by selectively providing and disabling access to networks. For example, U.S. Pat. No. 5,894,551 describes a switching system for the connection between the network and the CPU's network card. Unfortunately, the switching system is difficult to retrofit into a preexisting personal computer system.

Thus, there is a significant need for a computer system which provides protection to the system's hard drives and network access. Moreover, there is a need for a security system that is inexpensive and can be incorporated as an after-market unit into personal computer systems.

SUMMARY OF THE INVENTION

Briefly, in accordance with the invention, I provide a computer system including a switch box for selectively controlling the power supply and data transmission to and from a computer memory storage device. I also provide a switching system for selectively controlling the flow of information from a network to a computer's processing system.

The computer system includes a computer processing unit, monitor, and input devices such as a keyboard and mouse. Within the computer's housing, a power supply, processor and memory storage devices are provided. In addition to these traditional components, the computer system of the present invention includes a switch box which controls the operation of one or more memory storage devices within the computer housing. The switch box includes a housing structured to mount within the traditional CPU tower. More particularly, the face of a CPU tower is usually provided with a plurality of bays for the mounting of externally accessible peripherals such as a CD-ROM, DVD reader/writer, and a floppy disk drive. The switch box housing of the present invention is constructed to reside within one of these bays for convenient access by the computer user and simplistic integration into the central processing unit. The switch box includes a plurality of electrical on/off switches, which are preferably push-button switches mounted to the switch box's faceplate. As explained in greater detail below, the push-button switches control the power supplied to individual memory storage devices and control the transmission of commands to the memory storage device so as to enable or disable unauthorized access to the memory storage device. In a preferred embodiment, the switch box includes a total of six switches. The six switches are separated into three pairs with each pair controlling both the power and data supply of three individual memory storage devices.

The preferred switch box includes at least one input power connector which electrically connects via a power cable to the CPU's power supply. In a preferred embodiment, the switch box includes two input power connectors, both of which are connected by power cables to the power supply, to provide redundancy. In accordance with most present day computer systems, the power connectors, and corresponding power cables, include a 12 volt input, a 5 volt input and two ground paths.

The switch box of the present invention also includes output power connectors electrically connected to the input power connectors. The power supplied to the output power connectors is controlled by the corresponding switches positioned on the switch box face plate which are electrically connected in series between the input and output power connectors. More particularly, the output power connectors electrically connect to the CPU's power supply through the power cables, switch box input connectors and the switch box's internal wiring. The output power connector, in turn, connects to individual memory storage devices. Power supplied to the memory storage device is controlled using a corresponding switch so that the memory storage device can be activated and deactivated as desired by the computer's user.

In addition to power control, the switch box provides control over the transmission of data to and from a memory storage device. Computer systems include a data cable which connects memory storage devices to the computer's processor. These signal cables typically include dozens of wires and a corresponding number of pins or sockets within electrical connectors. For example, most memory devices connect to the processor using a 40 channel "IDE" cable. Typically, one of the wires and signal cables, and corresponding pins or sockets, is dedicated to transmitting command signals from the processor to the memory storage device. In standard personal computers, this channel is referred to as the "interrupt" channel and is typically provided through pin number 31 in the IDE cable which connects the computer's processor to a hard disk drive.

It is a primary object of the present invention to provide a switchable control to enable or disable the transmission of the interrupt signal from the processor to the memory storage device. To this end, the switch box includes one or more switches which electrically open or close the interrupt channel. These "signal" switches are electrically connected in series with the interrupt channel. To this end, preferably a traditional IDE cable connector is modified to allow 39 of the 40 channels to be connected directly from the processor to the memory storage device through the IDE cable. However, in a preferred embodiment of the invention, the IDE cable connector mating to the memory storage device is modified so that signals transmitted from the processor through the interrupt channel into pin number 31 are diverted by a separate signal cable to the switch box of the present invention. The interrupt signals are then transmitted through one of the switches and directed back to the IDE cable pin 31 for transmission into the memory storage device. Provision of the switch in series with the interrupt channel allows for the computer user to selectively enable or disable the interrupt channel. With the interrupt channel disabled, in other words in an open condition, the computer processor cannot transmit signals to the memory storage device, resulting in the memory storage device being unable to store information or download information. In other words, placing the interrupt channel in a disabled condition makes the memory storage device completely inaccessible. However, retriggering the switch to a closed position allows signals to be transmitted between the memory storage device and processor.

In addition to a subsystem for controlling the power and signals to a hard drive, the computer system of the present invention preferably includes a switching system for controlling the connection between a network, such as a LAN, WAN or Internet network, with the computer's central processing unit. For purposes of describing the computer system of the present invention, the central processing unit includes any network cards utilized by the computer.

The computer system includes a network port located on the rear of the computer's housing which may be a traditional female connector electrically coupled to the computer's network card. To control access to a network, the computer system includes a bracket assembly forming a portion of the rear of the computer's housing. The bracket assembly includes an input port and an output port. The terms "input" and "output" are used for simplicity because, as understood by those skilled in the art, both the input and output ports transmit signals in both directions. Preferably, both the input port and output port are mounted to the bracket to face exterior to the computer's housing so as to be easily accessible. The input port and output port are electrically coupled except for an intermediate switch which selectively provides an open circuit or closed circuit for permitting or disabling the electrical connection between the input port and output port.

The intermediate switch is preferably a manual switch which may be located either upon the computer's housing or exterior to the computer's housing. In a first embodiment, the bracket assembly includes a "switch" port mounted upon the housing exterior for connecting to a cable traveling to an exterior switch. Signals traveling from the bracket assembly's input port are routed exterior to the computer's housing to the switch and then routed back through the cable to the bracket assembly's output port. Alternatively, the switch may be mounted to the computer's housing with the manual lever, button or other manipulated device being accessible exterior to the housing. For this embodiment, signals traveling from the bracket assembly's input port are routed interior to the computer's housing to the switch and then routed back through the cable to the bracket assembly's output port.

In addition, the network switching system includes a wire harness including a cable connecting the network to the bracket assembly's input port and a relay cable for connecting the bracket assembly's output port to the computer's network port. Instead of network communications being transmitted directly from the network to the network port, the signals are rerouted through the bracket assembly's input port, manual switch and output port, and then routed to the computer's network port. Access to the network is then controlled by simple manual manipulation of the switch to create an open or closed circuit, thereby enabling or disabling access by the computer to the network.

The manual switch may also control the "interrupt" channel of a selected hard drive. As explained above, each hard drive can be selectively controlled by selectively enabling or disabling the transmission of the "interrupt" channel typically found on pin number 31 of an IDE cable. The signal is rerouted through a signal cable to the manual switch and routed back to the IDE cable. Thus, for this embodiment of the invention, activation of the switch provides an open or closed condition in the interrupt channel thereby selectively activating or deactivating a hard drive, as well as corresponding selective activation or deactivation of the network system.

In still an additional embodiment of the invention, the bracket assembly includes an input power connector for receiving power from the power supply and an output power connector for routing power to one of the computer's hard drives. Of course, cables are provided for routing power to the input connector and for transmitting it from the bracket assembly's output power connector to the hard drive. Coupled intermediate to the input power connector and output power connector, the bracket assembly includes a bracket assembly power switch for selectively enabling and disabling the transmission of power to the particular hard drive.

Where the computer system of the present invention includes a manual switch that controls signal to both a network and hard drive, and a bracket assembly switch for controlling power to a hard drive, the switch box of the present invention may not be needed. For example, where the computer user does not require control of multiple drives, such as where sensitive data and network use is limited to a single hard drive, signal control and power control of an alternate hard drive may not be required. In such a circumstance, the switch box of the present invention for controlling signal and power of multiple hard drives may be eliminated.

The combination of power and signal enable-disable of the present invention provides security to a computer's network and memory storage device that was previously unavailable.

Therefore, it is an object of the present invention to provide a switch box which provides added security to a computer system.

It is an additional object of the present invention to provide a switch box which is inexpensive to manufacture, easy to install and convenient to use.

It is still an additional object of the present invention to provide a bracket assembly and switch system for controlling communication to a network.

It is still an additional object of the present invention to provide a bracket assembly and switch system for controlling signal and power transmission of a computer's hard drive.

These and other specific objects and advantages of the invention will be apparent to those skilled in the art from a review of the following detailed description taken in conjunction with the drawings.

BRIEF DESCRIPTION OF THE DRAWINGS

FIG. 15 is a rear view of a computer housing illustrating a rear bracket assembly and external switch for controlling access to a network, power to hard drive 1 and signals to hard drive 2.

DETAILED DESCRIPTION OF THE INVENTION

Figure 1:
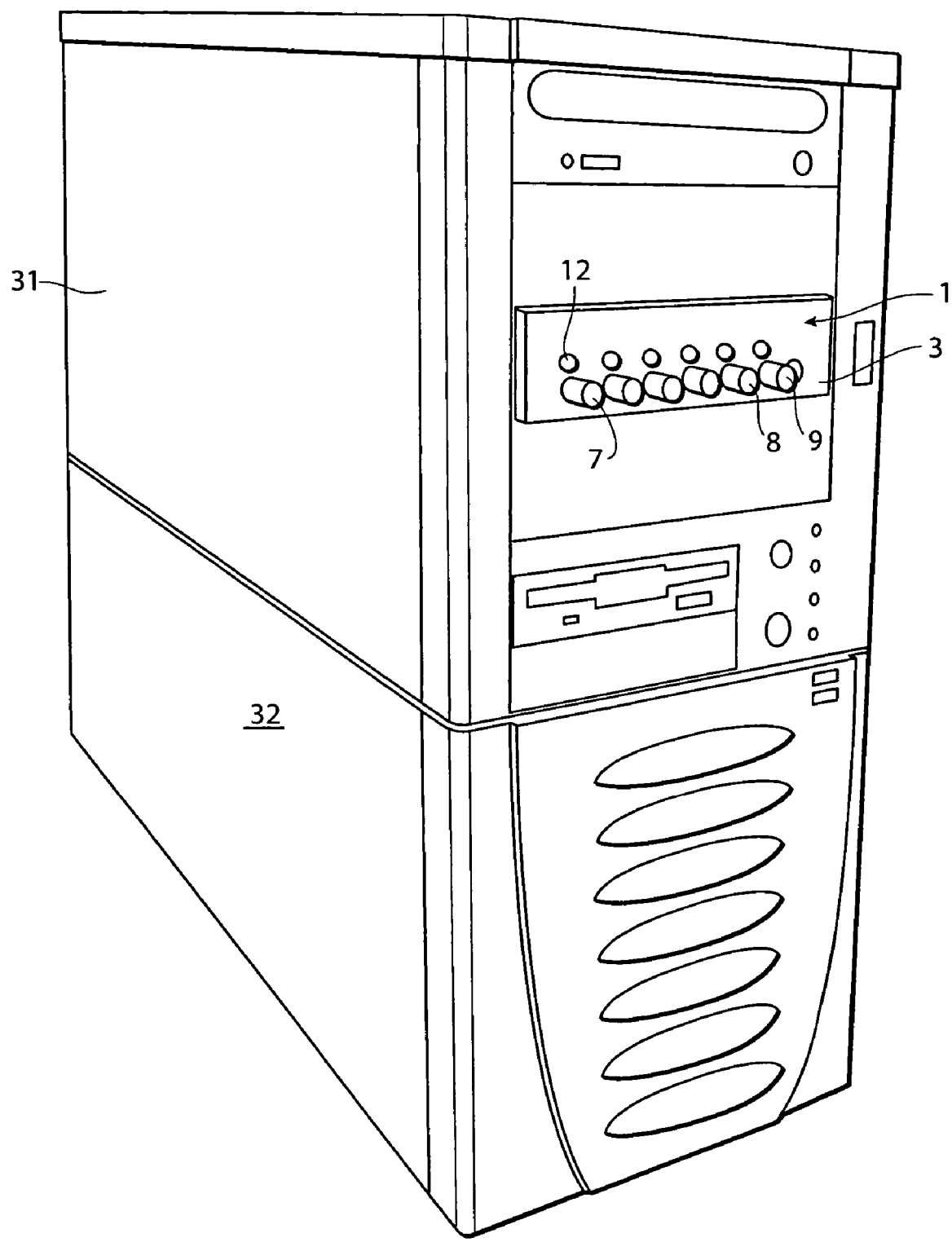
FIG. 1 is a perspective view of a central processing unit (CPU) of the present invention.

While the present invention is susceptible to the embodiment in various forms, as shown in the drawings, hereinafter will be described the presently preferred embodiments of the invention with the understanding that the present disclosure is to be considered as a exemplification of the invention and is not intended to limit the invention to the specific embodiments illustrated.

The computer system of the present invention includes the traditional components typically found within the ubiquitous personal computer system. With reference to the figures, the computer system includes a central processing unit 31, including a housing 32 for containing various components. These components include a power supply 33, a processor, also commonly referred to as a motherboard 35, and numerous memory storage devices. As shown in the figures, these memory storage devices include CD-ROMs 37, hard drives 39 and 41, or additional units such as Zip drives, floppy drives, etc. The CPU 31 also contains various cables for connecting the power supply to the various units and signal cables for connecting memory devices to the processor. Not shown in the figures, the computer system includes a monitor and one or more tactile input devices such as a keyboard, mouse, video camera, gaming joystick, etc. Though not described herein, the computer system of the present invention may include alternative memory storage devices or alternative tactile input devices without departing from the spirit and scope of the invention.

In addition to the traditional components found within a computer system, the computer system of the present invention includes a switch box 1. With a reference to FIGS. 1–9, the switch box 1 includes a housing 3 and is preferably constructed to be positioned within one of the plurality of bays formed in a CPU for mounting externally accessible peripherals.

In operation, the switch box 1 of the present invention controls the operation of one or more memory storage devices which are electrically connected to the switch box. To this end, the switch box 1 includes a plurality of manual on/off switches 7 for selectively creating an electrically open condition or closed condition. As shown in the figures, in a preferred embodiment, the switches are push button on/off switches. However, the switches may be rotary, toggle or other type of switches without departing from the spirit and scope of the invention. Moreover, the switch box may include lights, such as LEDs 12 for indicating the open or closed condition of an adjacent switch.

As shown in the figures, in a preferred embodiment the switch box includes a total of six switches for controlling the operation of up to three memory storage devices. The six switches are separated into three pairs of switches with each pair including a power switch 8 and a signal switch 9. The power switch controls the corresponding power to a memory storage device, while the signal switch 9 controls the transmission of data signals to and from the memory storage device. Selective operation of these signal switches enables a computer user to deactivate the memory storage device while maintaining the power to the memory storage device by simply deactivating a corresponding signal switch 9. Meanwhile, entire operation of the memory storage device can be disabled by eliminating all power to the unit using a corresponding power switch 8.

Figure 2:
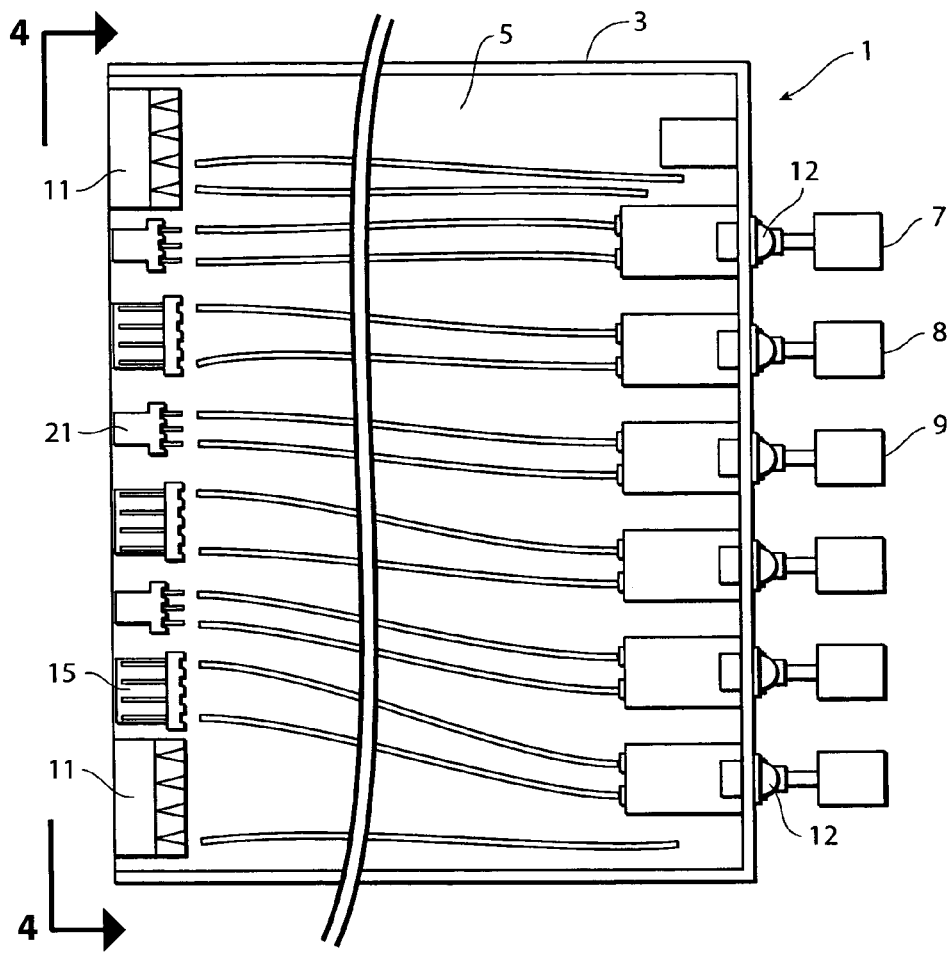
FIG. 2 is a top plan view of the switch box used within the computer system of the present invention.
Figure 3:
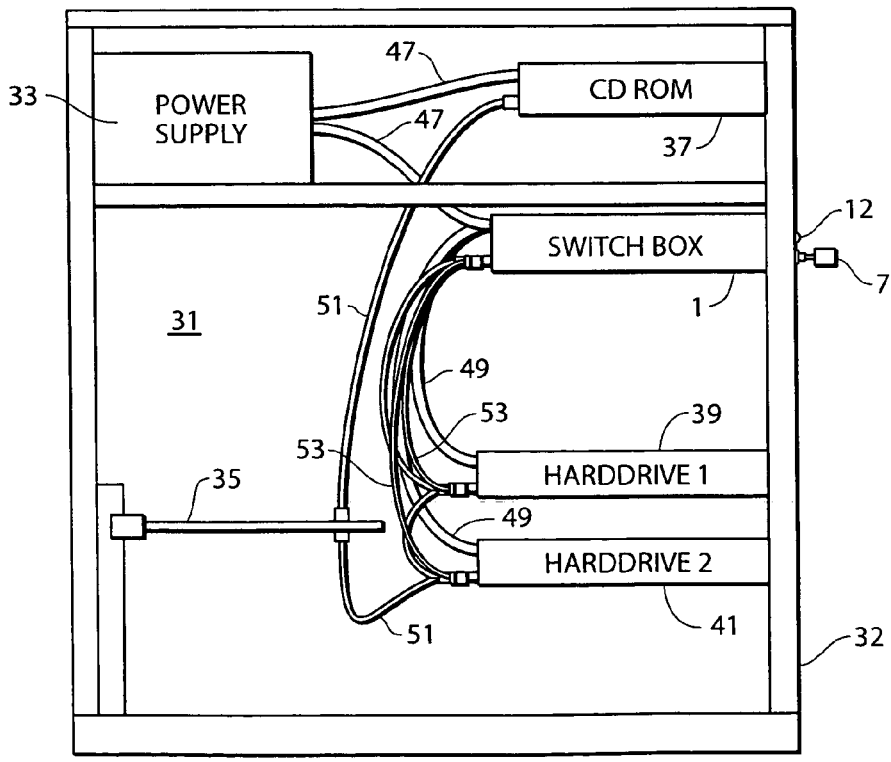
FIG. 3 is a side cutaway plan view of the internal components of the central processing unit of the present invention.
Figure 4:
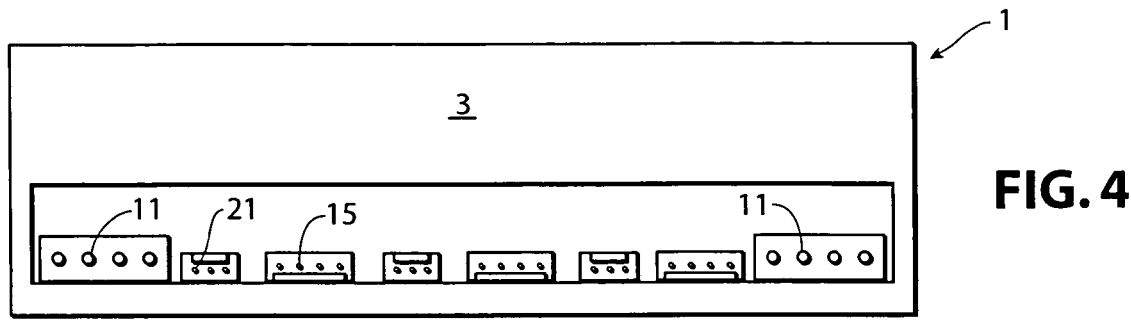
FIG. 4 is a side view illustrating the connectors within a preferred switch box of the present invention.
Figure 5:
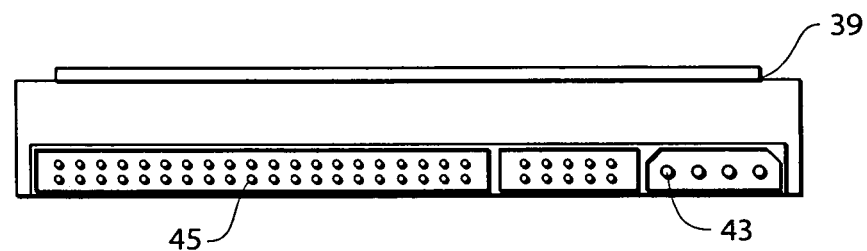
FIG. 5 is a side view illustrating the connectors of a traditional hard drive.
Figure 6:
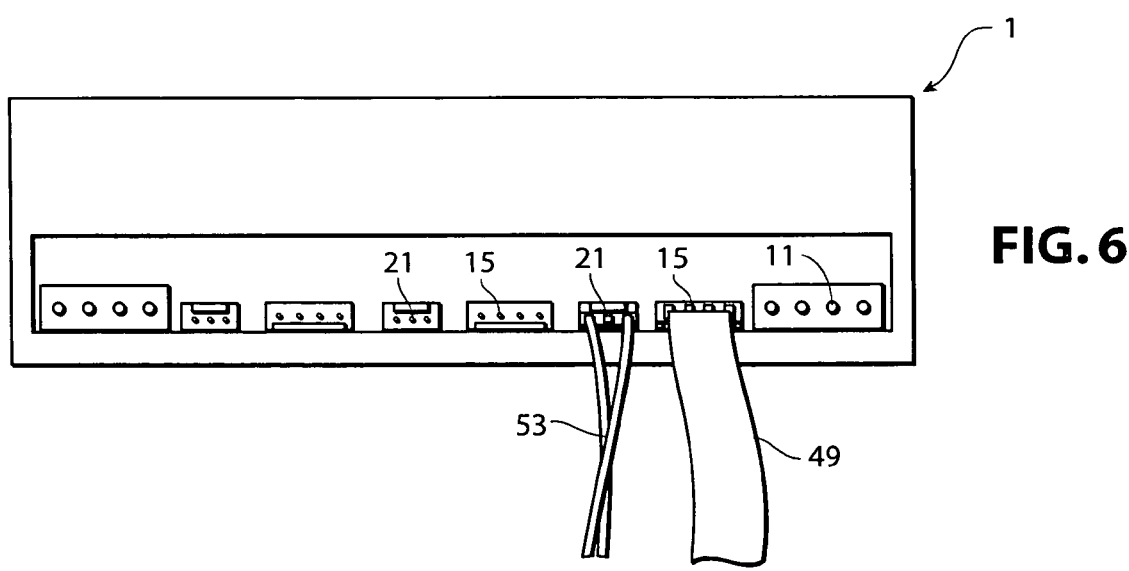
FIG. 6 is a rear view of the switch box of the present invention including signal cables and power cables which mate to a controlled memory storage device.

For simplicity, the memory storage devices will be referred to hereinafter as a hard drive, though alternative memory storage devices may be just as easily used with the switch box of the present invention. With reference to FIG. 3, the power supply does not supply power directly to the hard drive as traditionally constructed. Instead, the switch box of the present invention includes a power cable 47 which directs power to the switch box's input power connectors 11. Preferably, the power cable 47 includes four wires including a 12 volt, 5 volt and 2 ground. With reference to FIG. 2, the 12 volt, 5 volt and ground paths are then electrically connected to the power switches 8. The power switches 8 provide a selective open and close condition to all four electrical paths before directing these electrical paths to output power connectors 15. As shown in the figures, preferably the switch box includes a pair of input power connectors 11 to provide redundancy. However, these input power connectors then split the individual power and ground paths into three sets of corresponding output power channels for redirection to memory storage devices, such as hard drives 39 and 41. The redirection of power from the switch box to the hard drive is accomplished by using four wire power harnesses 49. In operation, power from the power supply to the hard drive can be selectively activated and deactivated using a corresponding push button switch 8. For example, where the hard drive 1 has been electrically connected to the power supply through the left hand switch of the switch box, the hard drive 1 can be completely disabled by removing all power to the hard drive by placing switch one in an open condition. The hard drive can then be "rebooted" by providing power to the hard drive by placing the left hand switch in a closed position. Additional hard drives can be activated and deactivated using alternate switches provided within the switch box.

There are numerous instances where computer users wish to deactivate access to a memory storage device, such as a hard drive, without completely deactivating power to the unit which requires lengthy reboot procedures at a later time. To provide security to the memory storage device without requiring the disablement of power to the unit, the switch box of the present invention further includes one or more signal switches 9 which are provided for selectively activating or deactivating the electrical paths from the processor to the memory storage device.

In a preferred embodiment, the computer system includes a traditional data cable 51 which connects the processor 35 to one or more hard drives 39 and 41, or other memory storage devices. However, preferably the interrupt panel, typically provided through a pin 31, in a traditional IDE cable, is rerouted to pass through a controlling signal switch 9. The traditional signal path from the processor 35 to the hard drive 39 or 41 may be rerouted at any point between the two units. However, in a preferred embodiment, illustrated in FIGS. 7–9, the interrupt signal is rerouted from the IDE cable adjacent to the memory storage device. To this end, the computer system includes an additional interrupt connector 55 having a plurality of electrically conductive pins 59 for providing direct signal paths to and from the IDE cable 51 into the memory storage device 39 and 41. However, the computer system of the present invention further includes modified pins 61 for rerouting the interrupt channel into signal wires 53 which lead to the switch box 1 of the present invention. The signal wires 53 electrically connect to a signal switch 9 which selectively provides an open or closed circuit. With the switch in a closed circuit, the processor is capable of sending signals through the interrupt channel to the memory storage device. However, when the signal switch 9 is placed in an open condition, the computer processor 35 is incapable of transmitting commands to the memory storage device thereby making the memory storage device incapable of storing information or transmitting information. In other words, placing the signal switch 9 in an open condition disables the memory storage device completely without removing power from the unit.

Figure 7:
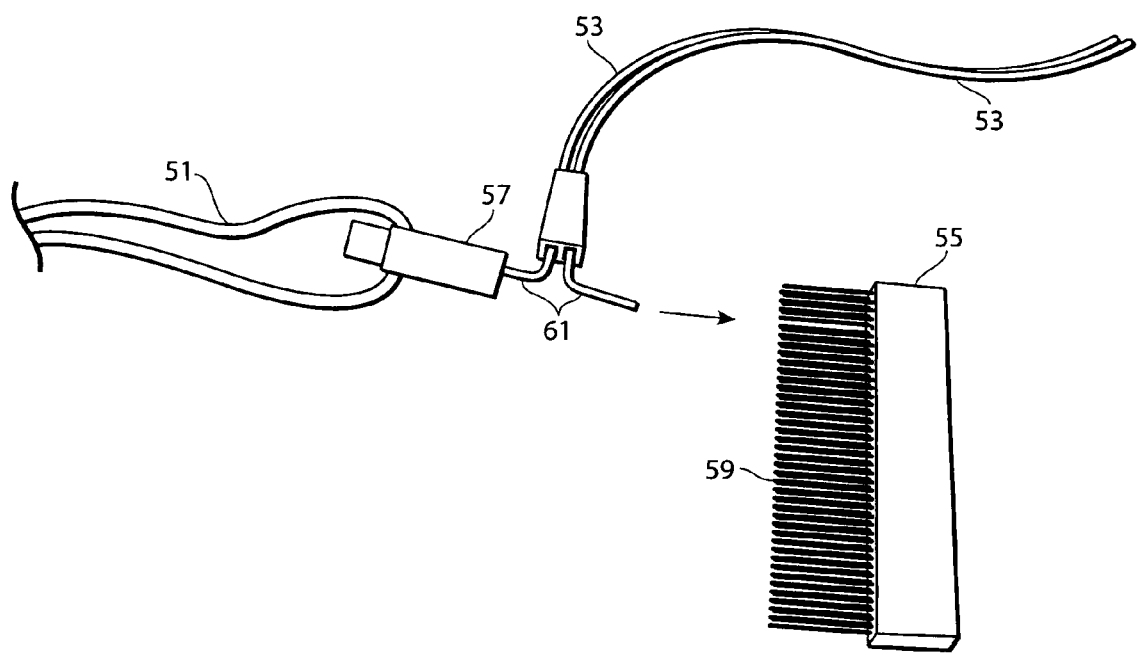
FIG. 7 is an exploded perspective view illustrating a preferred construction for rerouting the interrupt channel from the processor to the memory storage device through a signal switch.
Figure 8:
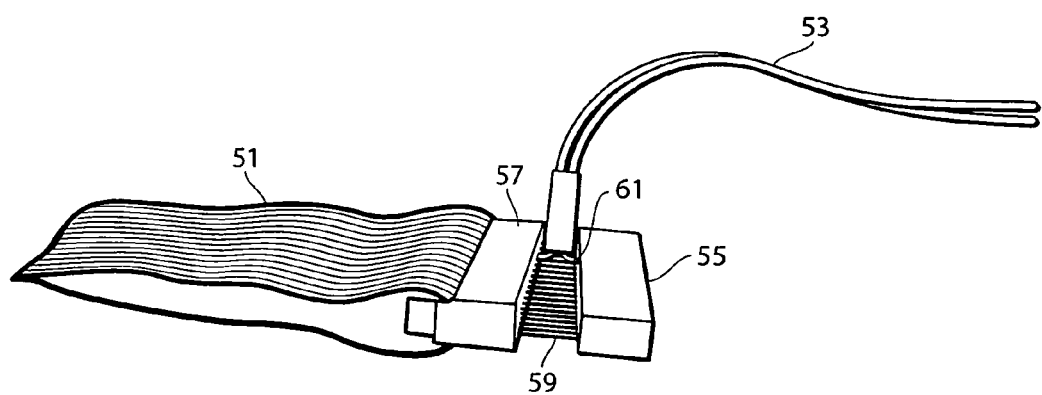
FIG. 8 is a perspective view illustrating a preferred construction for rerouting the interrupt channel from the processor to the memory storage device through a signal switch.
Figure 9:
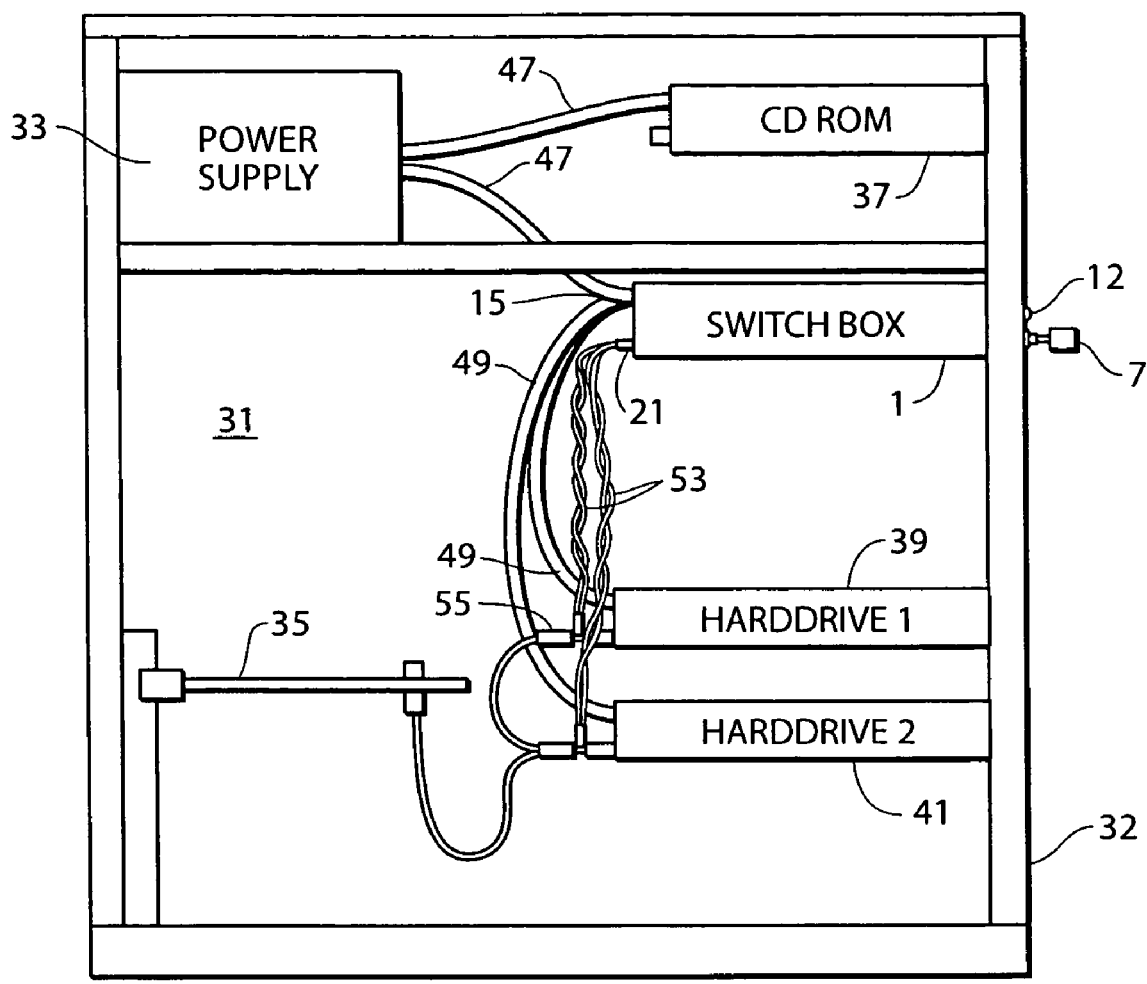
FIG. 9 is a side cutaway view illustrating a computer housing of the present invention including a switch box connected to memory storage devices by power cables and signal cables.

As shown in FIGS. 7–9, the rerouting of the interrupt channel may be accomplished using the combination of an intermediate connector and separate modified pins and signal cable 53. This construction is considered preferable when using preexisting data cables provided between the processor 35 and memory storage device. With reference to FIG. 3, in an alternative construction the IDE cable 51 is constructed to include signal wires 53 for mating to the switch box's signal connectors 21.

Any number of memory storage devices can be controlled using the switch box of the present invention. As shown in the figures, a preferred switch box includes six switches for controlling the power and signal operation of three memory storage devices. However, any number of buttons may be included in the switch box for controlling any number of memory storage devices. In addition, the computer system may be wired to control some but not all memory storage devices. For example, as shown in FIG. 3, in a preferred construction the hard drive 1 and 2 is electrically connected to the switch box so that the power and operation of the unit can be selectively activated or deactivated. However, the CD-ROM 37 is not connected to the switch box. Thus, the CD-ROM is incapable of being activated or deactivated in accordance with the present invention. Notwithstanding, the computer user may connect the CD-ROM to the switch box if additional security is desired.

With reference to FIGS. 10–15, in addition to a subsystem for controlling the power and signals to a hard drive, the computer system of the present invention preferably includes a switching system for controlling the connection between a network, such as a LAN, WAN or Internet network, with the computer's central processing unit.

Figure 12:
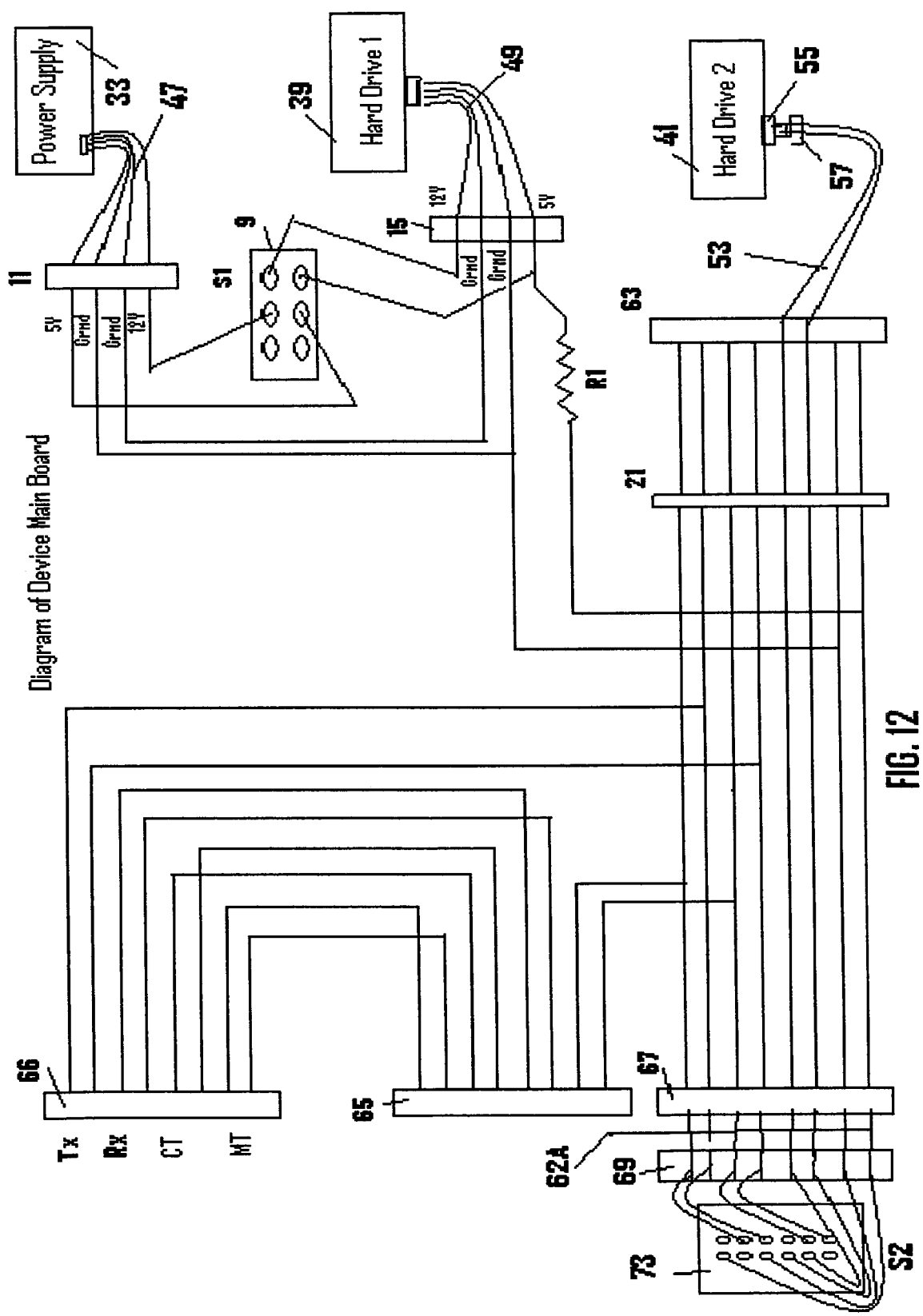
FIG. 12 is a circuit diagram illustrating the present invention including a rear bracket assembly and switch controlling access to a network, power to hard drive 1 and signals to hard drive 2.
Figure 13:
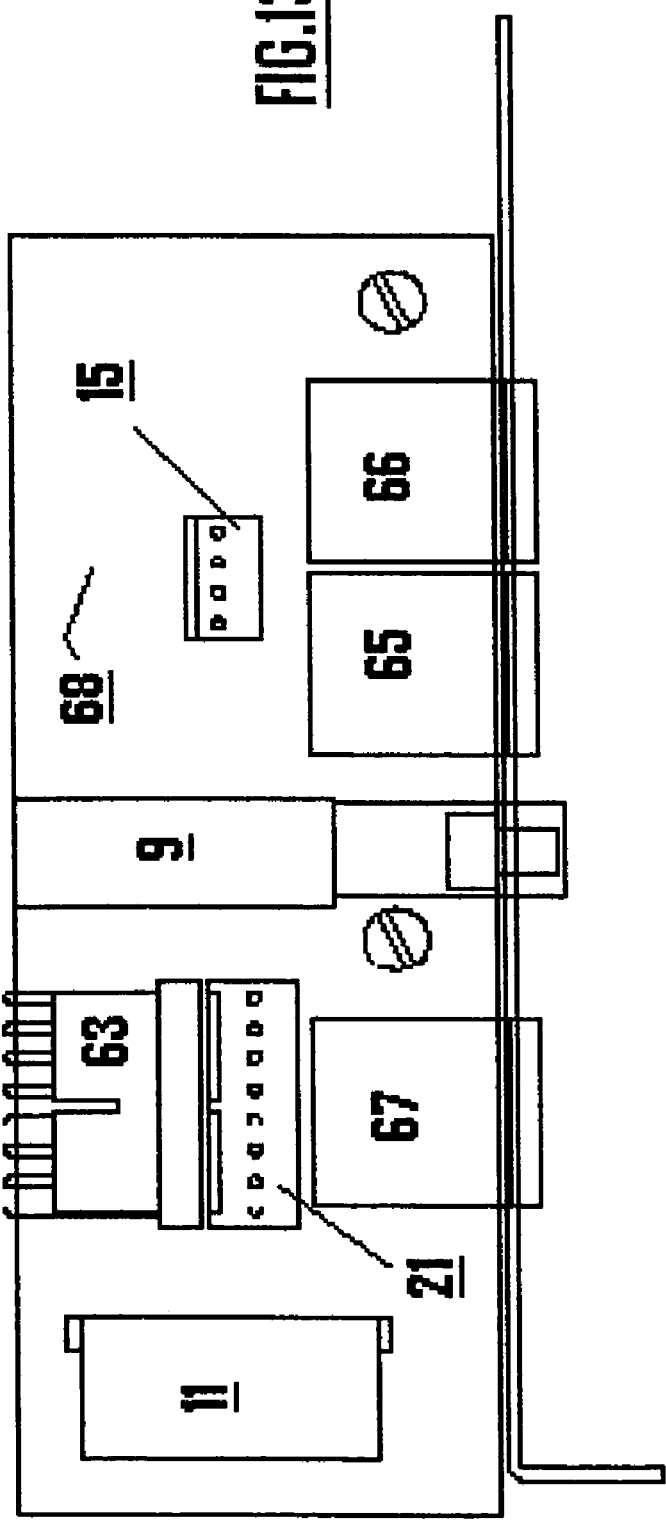
FIG. 13 is a top view of a rear bracket assembly for controlling access to a network, power to hard drive 1 and signals to hard drive 2.
Figure 14:
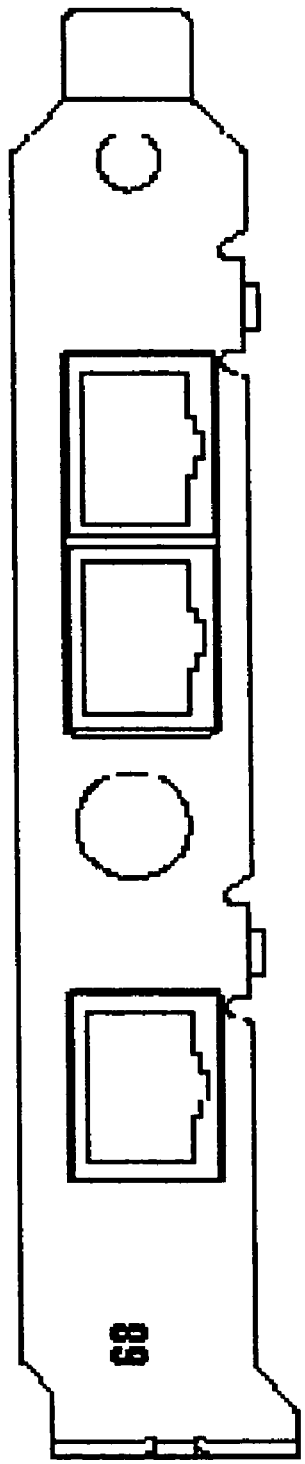
FIG. 14 is a rear view of a rear bracket assembly for controlling access to a network, power to hard drive 1 and signals to hard drive 2.

With reference particularly to FIGS. 12–14, the computer system includes a network port 74 located on the rear of the computer's housing which may be a traditional female connector electrically coupled to the computer's network card. Moreover, the computer system includes a bracket assembly 68 forming a portion of the rear of the computer's housing. The bracket assembly 68 includes an input port 65 and an output port 67. Both the input port and output port form part of the bracket assembly 68 mounted upon the housing exterior and are positioned to face exterior to the computer's housing so as to be easily accessible. The input port and output port are electrically coupled except for an intermediate switch 73 which selectively provides an open circuit or closed circuit for permitting or disabling the electrical connection between the input port 65 and output port 67.

Figure 10:
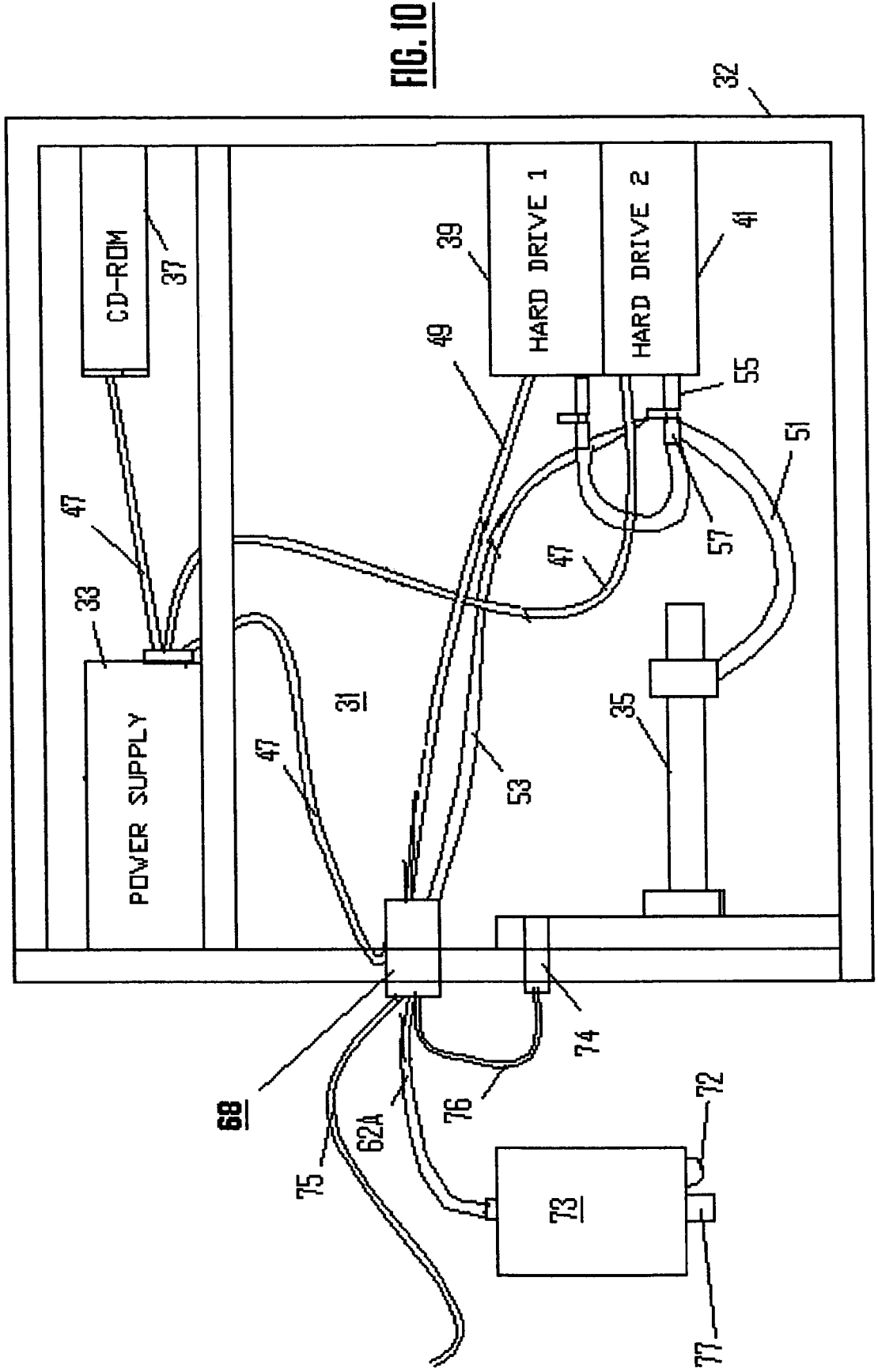
FIG. 10, is a side cutaway view illustrating a computer housing of the present invention including a rear bracket assembly and external switch controlling access to a network, power to hard drive 1 and signals to hard drive 2.
Figure 11:
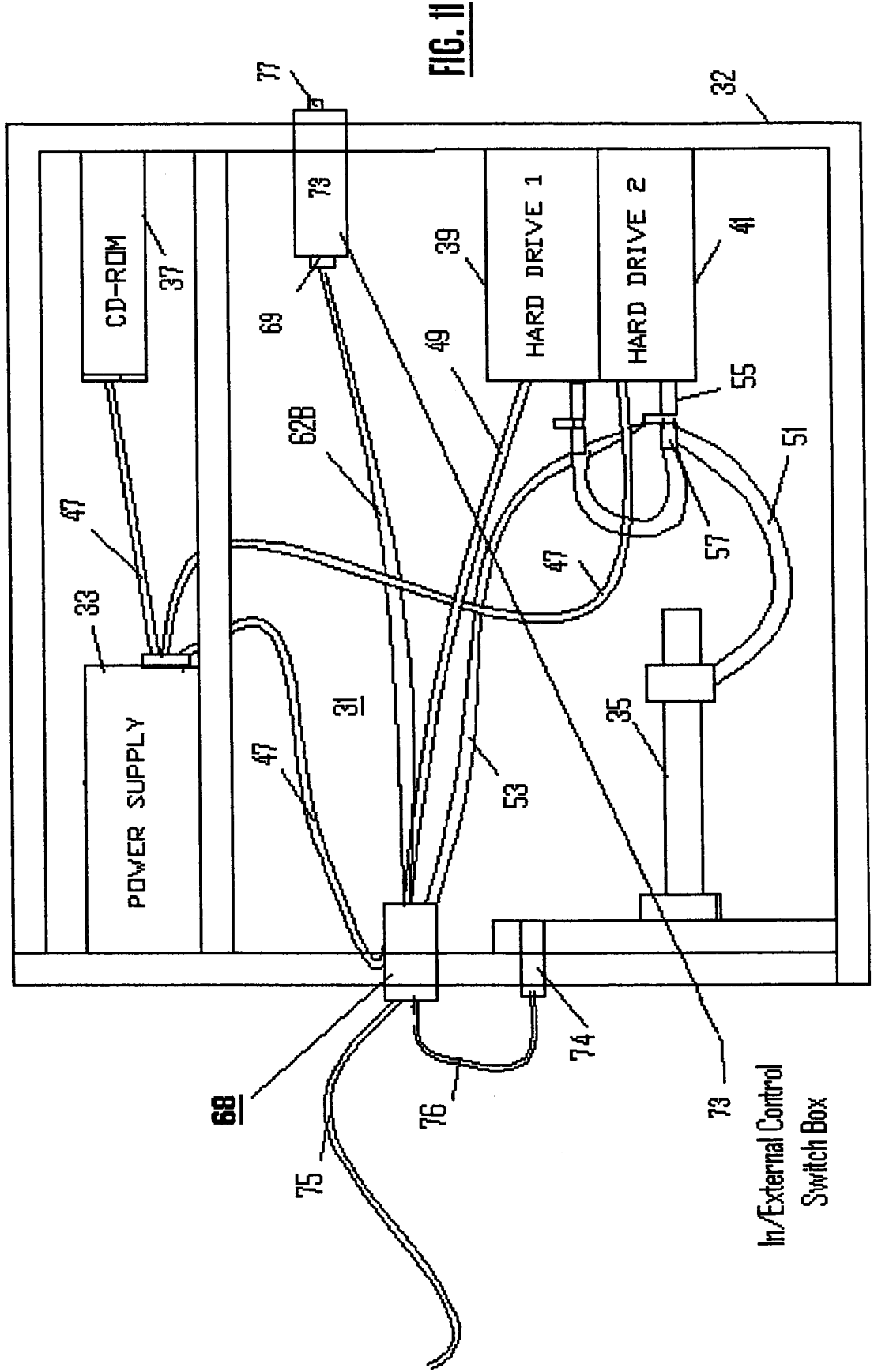
FIG. 11, is a side cutaway view illustrating a computer housing of the present invention including a rear bracket assembly and front mounted internal switch controlling access to a network, power to hard drive 1 and signals to hard drive 2.

The intermediate switch 73 is preferably a manual switch, including a toggle, knob or button 77 which may be located either upon the computer's housing or exterior to the computer's housing. As shown in FIGS. 10, 13 and 15, in a first embodiment, the bracket assembly 68 includes a "switch" port 67 for connecting to a switch cable 62A traveling to an exterior switch 73. Signals traveling from the bracket assembly's input port 65 are routed exterior to the computer's housing to the switch 73 and then routed back through the switch cable 62A to the bracket assembly's output port 66. With reference to FIG. 11, alternatively the switch 73 may be mounted to the computer's housing with the manual lever, button or other manipulated device 77 being accessible exterior to the housing. For this embodiment, signals traveling from the bracket assembly's input port 65 are routed interior to the computer's housing to the switch 73 and then routed back through the cable 62B to the bracket assembly's output port 66.

In addition, the network switching system includes additional wire harnesses including a network cable 75 connecting a network to the bracket assembly's input port 65 and a relay cable 76 for connecting the bracket assembly's output port 66 to the computer's network port 74. Instead of network communications being transmitted directly from the network to the network port, the signals are rerouted through the bracket assembly's input port 65, manual switch 73 and output port 66, and then routed to the computer's network port 74. Access to the network is then controlled by simple manual manipulation of a button, toggle or knob 77 to create an open or closed circuit, thereby enabling or disabling access by the computer to the network.

With reference to FIGS. 10–12, the manual switch 73 may also control the "interrupt" channel of a selected hard drive 41. As explained above, each hard drive can be selectively controlled by selectively enabling or disabling the transmission of the "interrupt" channel typically found on the pin 31 of an IDE cable. The signal is rerouted through a signal cable 53 to the manual switch and routed back through the signal cable 53 to the hard drive connector 55. Thus, for this embodiment of the invention, activation of the switch 73 provides an open or closed condition in the interrupt channel thereby selectively activating or deactivating a hard drive, as well as providing corresponding selective activation or deactivation of the network system.

With reference to FIGS. 12 and 13, in still an additional embodiment of the invention, the bracket assembly 68 includes an input power connector 11 for receiving power through the power cable 47 from the power supply 33 and an output power connector 15 for routing power to any one of the computer's hard drives. Cables 47 and 49 are provided for routing power to the input power connector and for transmitting the power from the bracket assembly's output power connector to the hard drive 39. Coupled intermediate to the input power connector 11 and output power connector 15, the bracket assembly 68 includes a bracket assembly power switch 9 for selectively enabling and disabling the transmission of power to a selected hard drive. The hard drive with power control may be the same hard drive selected for controlled access of data, or as shown in the drawings, the hard drive 39 with power control may be a hard drive other than the hard drive 41 having signal control.

As shown in the circuit diagram of FIG. 12, a preferred switch 73 includes four input terminals and four output terminals for providing four open or closed circuits, preferably, though not necessarily, with all circuits controlled by a single button, toggle or knob 77. A network cable often has six wires, in which transmission and receipt of information is typically controlled over only two wires designated Tx and Rx. Preferably, the non-transmit and non-receive signals are routed directly between the input port 65 and output port 66. Meanwhile, the Tx and Rx signals are routed from the input connector 65 through the switch 73 to the output connector 66. Upon the switch making a closed circuit, the network is accessible to the computer processor 35, while an open circuit makes the network inaccessible. In addition, in a preferred embodiment, the switch 73 includes input and output terminals dedicated to transmitting the "interrupt" signal through a cable 53 to a dedicated hard drive 41. Finally, the switch's remaining input and output terminals are preferably dedicated to power and ground for illuminating an LED indicator 72 located on the switch 73. The LED indicator provides a visual indication of the status of the button, toggle, or knob 77, the corresponding open or closed condition of the switch 73, and the corresponding enabled or disabled condition of the network and hard drive.

Still with reference to FIG. 12, but also FIGS. 10–15, the computer system preferably includes a manual power switch 9 for controlling power to a hard drive 39. The manual power switch may be located external to the computer housing (not shown). However, the manual power switch 9 is preferably located as part of the bracket assembly 68. Power is transmitted from the power supply 33 through the cable 47 to the switch 9. The switch 9 provides an open or closed circuit to supply or disable power to the hard drive 39 through output terminals 15 and the power cable 49.

Where the computer system of the present invention includes a manual switch 73 that controls signals to both a network and hard drive, and a bracket assembly switch 9 for controlling power to a hard drive, the switch box 1 of the present invention may not be needed. For example, where the computer user does not require control of multiple drives, such as where sensitive data and network use is limited to a single hard drive, signal control and power control of an alternate hard drive may not be required. In such a circumstance, the switch box of the present invention for controlling signal and power of multiple hard drives may be eliminated.

Still additional modifications of the computer system of the present system can be made without departing from the spirit and scope of the invention. For example, herein is described a particular construction for disabling a signal path from the processor to a memory storage device without disabling power to the unit. However, alternative constructions wherein different signal paths are controlled through the switch box may be adopted without departing from the scope of the present invention.

Having described my invention in such terms to enable those skilled in the art to make and use it, and having identified the presently preferred embodiments thereof, I claim:

What is claimed is:

1. A computer system comprising:
a power supply;
a central processor unit including a network card;
a memory storage device;
a network coupled to said processor;
a housing for storing said power supply, central processing unit, and memory storage device, said housing including an interior, an exterior, a front and a back, said housing further including a network port which can be used for connecting said central processing unit directly to said network;
a bracket assembly mounted to said housing, said bracket assembly including an input port facing exterior of said housing and an output port facing exterior to said housing;
a harness system including a network cable exterior to said housing for connecting said network to said input port and a relay cable exterior to said housing for connecting said output port to said network port; and
a manual switch electrically connecting said input port and said output port for selectively interrupting and connecting said network to said central processing unit.

2. The computer system of claim 1 wherein:
said manual switch is located external to said housing; and
said harness system includes a switch cable routed exterior to said housing for connecting to said bracket assembly to said manual switch.

3. The computer system of claim 1 wherein:
said manual switch is located internal to said housing and accessible from said front of said housing; and
said harness system includes a switch cable routed interior to said housing for connecting to said bracket assembly to said manual switch.

4. The computer system of claim 1 further comprising:
a hard drive coupled to said power supply; and
a manual power switch affixed to said bracket assembly, said power switch electrically coupled between said power supply and said hard drive, said manual power switch for selectively interrupting and providing power to said hard drive.

5. The computer system of claim 1 wherein:
said memory storage device having a plurality of electrical input and output terminals, said electrical terminals including a control terminal for receiving control signals which control recording and transmission of information into and from said memory device;
an electrical harness for interconnecting said electrical terminals with said processor; and
said manual switch is interconnected between said control terminal and said processor, said manual switch having a first position allowing control signals to be transmitted from said processor to said memory storage device and a second position for preventing control signals to be transmitted from said processor to said memory storage device.

6. The computer system of claim 1 further comprising:
a manual power switch interconnected between said power supply and said memory device, said power switch including a first position allowing power to be transmitted from said power supply to said memory device and a second position preventing power to be transmitted from said power supply to said memory device.

7. The computer system of claim 6 wherein said manual power switch forms part of said bracket assembly.

8. The computer system of claim 5 further comprising:
a manual power switch interconnected between said power supply and said memory device, said power switch including a first position allowing power to be transmitted from said power supply to said memory device and a second position preventing power to be transmitted from said power supply to said memory device.

9. The computer system of claim 8 wherein said manual power switch forms part of said bracket assembly.

* * * * *